US007073923B2

(12) United States Patent
Cope

(10) Patent No.: US 7,073,923 B2
(45) Date of Patent: Jul. 11, 2006

(54) VEHICLE CHARGER/FLASHLIGHT

(75) Inventor: Jason M. Cope, Mebane, NC (US)

(73) Assignee: Sony Ericsson Mobile Communications AB (SE)

( * ) Notice: Subject to any disclaimer, the term of this patent is extended or adjusted under 35 U.S.C. 154(b) by 54 days.

(21) Appl. No.: 10/632,317

(22) Filed: Aug. 1, 2003

(65) Prior Publication Data
US 2005/0024873 A1 Feb. 3, 2005

(51) Int. Cl.
F21V 33/00 (2006.01)

(52) U.S. Cl. ............. 362/253; 362/109; 320/114; 439/638

(58) Field of Classification Search ............. 362/253, 362/258, 431, 109; 439/500, 510, 638; 320/103, 320/114
See application file for complete search history.

(56) References Cited

U.S. PATENT DOCUMENTS

| 3,821,539 | A | * | 6/1974 | Kleiinman | 362/135 |
| 3,925,655 | A | * | 12/1975 | Mattis | 362/253 |
| 4,241,385 | A | * | 12/1980 | Asano | 362/258 |
| 4,258,305 | A | * | 3/1981 | Anglin | 320/105 |
| 5,162,719 | A | | 11/1992 | Tomura et al. | 320/2 |
| 5,690,509 | A | * | 11/1997 | Eisenbraun | 439/490 |
| 5,736,830 | A | | 4/1998 | Weng | 320/2 |
| 5,903,135 | A | * | 5/1999 | Posses et al. | 320/114 |
| 5,961,207 | A | * | 10/1999 | Petkovic | 362/376 |
| 5,964,616 | A | * | 10/1999 | Eisenbraun | 439/490 |
| 6,140,934 | A | * | 10/2000 | Lam | 340/815.4 |
| 6,551,142 | B1 | * | 4/2003 | Eisenbraun | 439/668 |
| 6,616,300 | B1 | * | 9/2003 | Hrabal | 362/258 |
| 6,630,682 | B1 | * | 10/2003 | Shanley et al. | 250/504 R |
| 6,842,356 | B1 | * | 1/2005 | Hsu | 363/146 |

FOREIGN PATENT DOCUMENTS

DE 2750634 5/1979

OTHER PUBLICATIONS

Patent Abstracts of Japan vol. 2002, No. 10, Oct. 10, 2002 & JP 2002 171679, Jun. 14, 2002 abstract.
'PCT Notification of Transmittal of the International Search Report and the Written Opinion of the International Searching Authority, or the Declaration' dated Jun. 22, 2004.

* cited by examiner

Primary Examiner—John Anthony Ward
(74) Attorney, Agent, or Firm—Coats & Bennett, P.L.L.C.

(57) ABSTRACT

A combination vehicle charger and flashlight provides illumination while a user connects a mobile device to the vehicle charger. A light source disposed on the mobile device plug of the vehicle charger connects to either an external or an internal power supply to provide a beam of light used to illuminate the mobile device. In one embodiment, the external power supply may comprise a vehicle battery. In an alternate embodiment, the internal power supply may comprise a battery disposed within the vehicle charger. Exemplary embodiments may also include a switch to selectively connect the light source to the power supply.

6 Claims, 3 Drawing Sheets

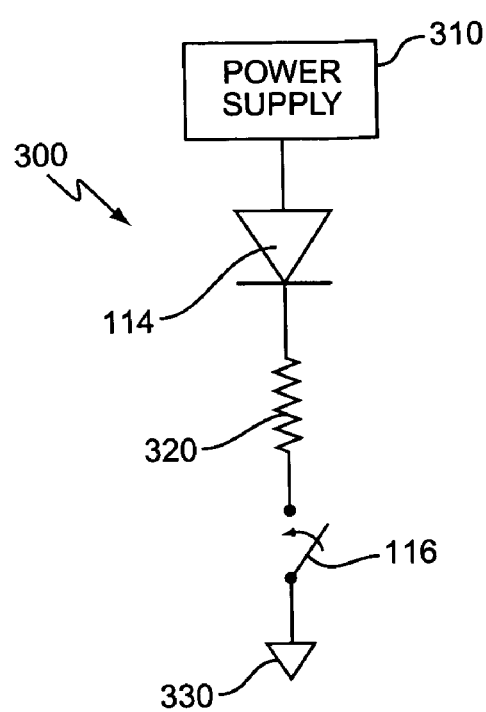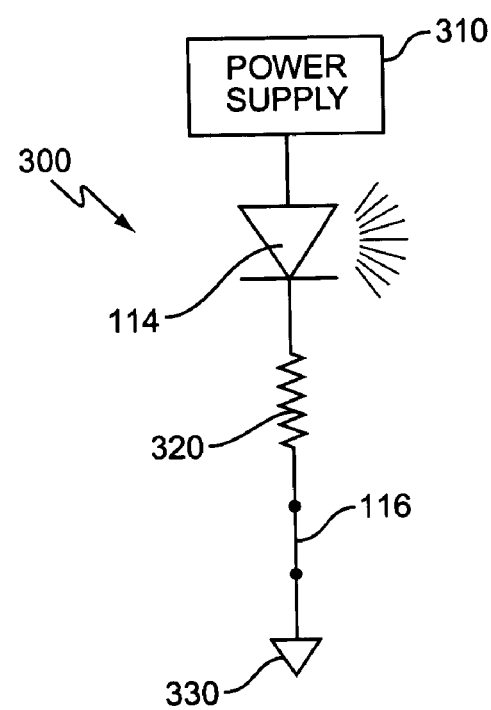
FIG. 3A     FIG. 3B

VEHICLE CHARGER/FLASHLIGHT

BACKGROUND OF THE INVENTION

The present invention relates generally to vehicle chargers for mobile devices, and more particularly to multi-functional vehicle chargers for mobile devices.

Vehicle cigarette lighter ports provide a readily available power supply within a vehicle. As a result, it is convenient to charge the batteries of a mobile device while traveling in a vehicle. However, when driving or riding in a vehicle at night, it is often difficult to see well enough to efficiently connect the vehicle charger to the mobile device.

While interior vehicle lights may provide sufficient illumination to connect the vehicle charger to the mobile device, such light sources are often very distracting to the driver. Smaller light sources, such as pen-lights or other portable flashlights, may not be available and/or may be cumbersome to use while attempting to connect the vehicle charger to the mobile device. The present invention addresses the above identified problems by providing a convenient light source for providing illumination while connecting a vehicle charger to a mobile device.

SUMMARY OF THE INVENTION

The present invention comprises a method and apparatus for providing illumination while connecting a mobile device to a vehicle charger. The vehicle charger includes a plug adaptable to connect to a mobile device. When electrically connected to a power supply, a light source disposed on the plug provides illumination while a user connects the vehicle charger to the mobile device. The power supply may comprise an external battery, such as a vehicle battery. Alternatively, the power supply may comprise an internal battery within the vehicle charger. Further, exemplary embodiments include a switch to selectively connect the light source to the power supply.

BRIEF DESCRIPTION OF THE DRAWINGS

FIGS. 3A–3B illustrate an exemplary circuit for the vehicle charger of the present invention.

DETAILED DESCRIPTION OF THE INVENTION

Figure 1:
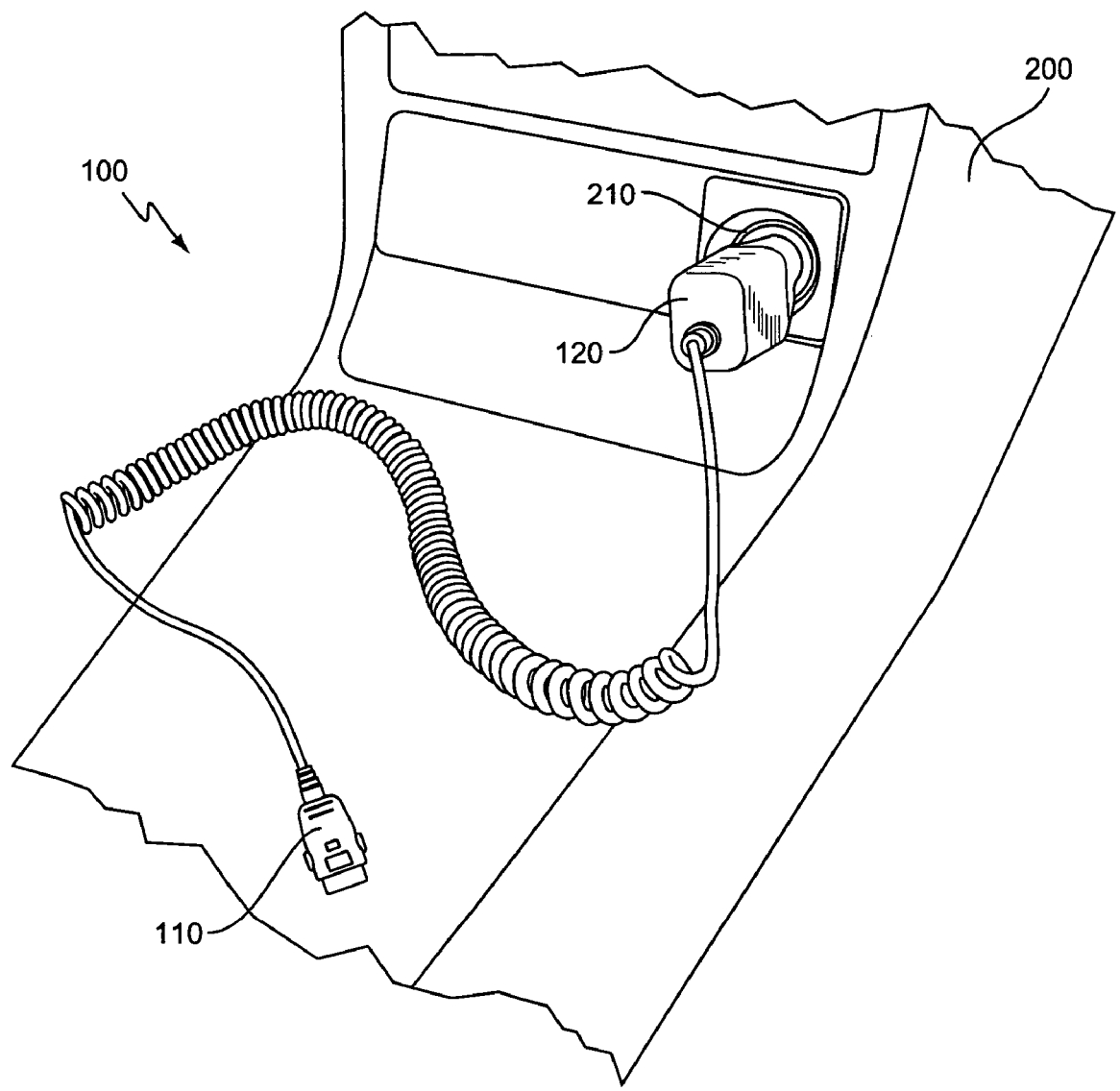
FIG. 1 illustrates an exemplary vehicle charger according to the present invention.

FIG. 1 illustrates an exemplary vehicle charger 100 according to the present invention. Vehicle charger 100 comprises a mobile device plug 110 and a power plug 120. A cord electrically connects mobile device plug 110 to power plug 120. Those skilled in the art will appreciate that vehicle chargers comprise a wide variety of mobile device plugs 110 and power plugs 120. As such, the present invention is not limited to the specific mobile device plug 110 or power plug 120 shown in FIG. 1.

Figure 2A:
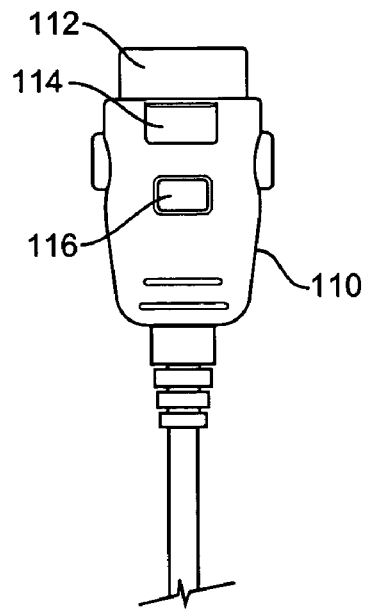
FIGS. 2A–2D illustrate exemplary mobile device plugs for the vehicle charger of FIG. 1.
Figure 2B:
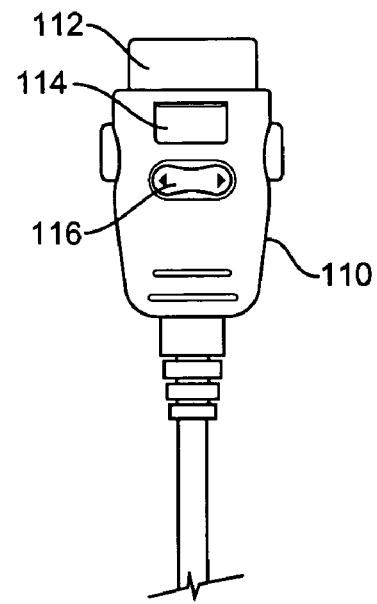

An exemplary mobile device plug 110 is shown in further detail in FIGS. 2A–2D. As shown in FIG. 2A, mobile device plug 110 includes an outer housing comprising a mobile device adaptor 112, a light source 114, and optionally, a switch 116. When light source 114 is electrically connected to a power supply 310 (FIG. 3A), as discussed further below, light source 114 provides a beam of light for illuminating an area proximate the mobile device plug 110. This beam of light may be used to illuminate the corresponding connector on the mobile device to facilitate connecting the mobile device to the vehicle charger in low-light environments. In addition, the beam of light may be used to provide illumination for performing other tasks.

Light source 114 may comprise any light source known in the art, such as a white light source, a light emitting diode (LED), etc. An exemplary light source 114 implemented in the vehicle charger 100 according to the present invention comprises a white or blue LED 114. LED 114 may dissipate between 50–100 mW and may provide between 425–850 mcd of luminous intensity. Typically, LED 114 dissipates approximately 70 mW and provides approximately 600 mcd of luminous intensity.

Figure 2C:
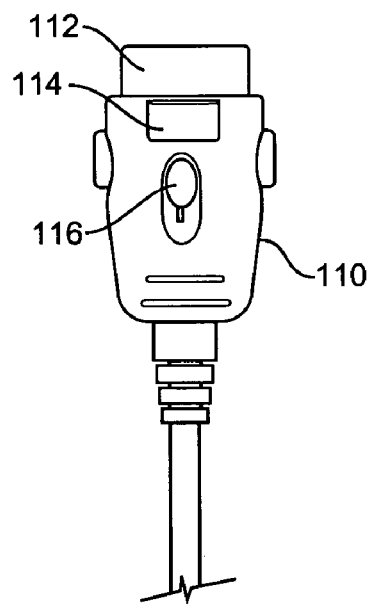
Figure 2D:
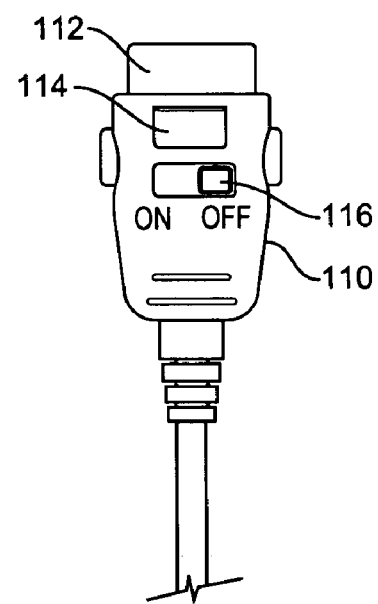

In exemplary embodiments, light source 114 connects to power supply 310 via switch 116. Switch 116 may comprise a momentary contact switch 116 (FIGS. 2A–2C), a conventional on/off switch 116 (FIG. 2D), or any other switch 116 known in the art. Exemplary momentary contact switches 116 include a push-button switch 116 (FIG. 2A), a rocker switch 116 (FIG. 2B), and a slide switch 116 (FIG. 2C). Those skilled in the art will appreciate that other switches not shown or discussed herein are also applicable to the present invention.

FIGS. 3A and 3B illustrate a simple circuit 300 for the present invention. Those skilled in the art will understand that the circuit 300 of FIGS. 3A–3B only illustrates the basic elements of a flashlight circuit; other elements superfluous to the present invention are not show for simplicity. Circuit 300 includes power supply 310, light source 114, resistor 320, switch 116, and ground 330. Power supply 310 provides power for at least the light source 114, and may comprise an external power supply 310, such as a vehicle power supply. As shown in FIG. 1, inserting power plug 120 into a cigarette lighter port 210 in the dashboard 220 of a vehicle provides an external power supply 310 for vehicle charger 100. In this embodiment, power supply 310 provides power for driving the light source 114 and for charging the mobile device. Alternatively, vehicle charger 100 may include an internal power supply 310, separate from the charging power supply, for light source 114. For example, an internal power supply 310 may comprise a battery disposed within mobile device plug 110.

The default state for light switch 116 is open. When switch 116 is open (FIG. 3A), circuit 300 comprises an open circuit and light source 114 does not emit any light. However, when closed (FIG. 3B), switch 116 completes the circuit, which allows current to flow from the power supply 310 to ground 330. Resistor 320 loads circuit 300 to provide the appropriate resistance for light source 114, as is well understood in the art. As a result, when a user activates switch 116, light source 114 provides illumination to facilitate connecting the mobile device to the vehicle charger.

The foregoing description and drawings describe and illustrate the present invention in detail. However, the foregoing only describes some embodiments. Accordingly, the present invention may be carried out in specific ways other than those set forth herein without departing from the essential characteristics of the invention. The present embodiments are, therefore, to be considered in all respects as illustrative and not restrictive, and all changes coming within the meaning and equivalency range of the appended claims are intended to be embraced therein.

What is claimed is:

1. A vehicle charger for a mobile device and adapted to be used with a vehicle having a power supply, said vehicle charger comprising:
   a cable;
   a first plug disposed on a first end of the cable, said first plug adapted to connect with the mobile device;
   a second plug disposed on a second end of the cable, opposite the first end, said second plug adapted to connect with the power supply of the vehicle;
   wherein said first plug comprises an outer housing and wherein the outer housing includes a light source for illuminating the mobile device while connecting said first plug to the mobile device.

2. The vehicle charger of claim 1 wherein said light source comprises a light emitting diode (LED).

3. The vehicle charger of claim 1 further comprising a switch disposed on the outer housing of said first plug to selectively connect said light source to a power supply.

4. The vehicle charger of claim 3 wherein said switch selectively connects said light source to a vehicle power supply via said second plug.

5. The vehicle charger of claim 3 wherein said switch selectively connects said light source to an internal power supply disposed within said first plug.

6. The vehicle charger of claim 3 wherein said switch comprises a momentary contact switch or an on/off switch.

* * * * *